(12) United States Patent
Mick et al.

(10) Patent No.: US 9,675,166 B2
(45) Date of Patent: Jun. 13, 2017

(54) ERGONOMIC TABLET COMPUTER HOLDER

(71) Applicant: Ergomick, LLC, Bartow, FL (US)

(72) Inventors: Thomas W. Mick, Columbus, IN (US); Matthew J. Mick, Bartow, FL (US)

(73) Assignee: Ergomick, LLC, Bartow, FL (US)

( * ) Notice: Subject to any disclaimer, the term of this patent is extended or adjusted under 35 U.S.C. 154(b) by 0 days.

(21) Appl. No.: 14/694,839

(22) Filed: Apr. 23, 2015

(65) Prior Publication Data

US 2015/0305481 A1    Oct. 29, 2015

Related U.S. Application Data

(60) Provisional application No. 61/983,316, filed on Apr. 23, 2014.

(51) Int. Cl.
*A45F 5/10* (2006.01)
*H04W 88/02* (2009.01)
*A45F 5/00* (2006.01)

(52) U.S. Cl.
CPC ............ *A45F 5/102* (2013.01); *A45F 5/00* (2013.01); *H04W 88/02* (2013.01); *A45F 2200/0525* (2013.01)

(58) Field of Classification Search
CPC .................................................. A45F 5/102
USPC ... 294/15, 16, 17, 24, 26, 27.1, 32, 34, 137, 294/170, 165, 171; D8/14; 16/422, 435, 16/443; 361/694.56
See application file for complete search history.

(56) References Cited

U.S. PATENT DOCUMENTS

| D373,610 S | * | 9/1996 | Ravencroft ................. D22/107 |
| D384,279 S | * | 9/1997 | Hepworth ...................... D9/434 |
| D436,036 S | * | 1/2001 | Manseau ........................ D9/434 |
| 6,527,300 B1 | | 3/2003 | Moss |
| 6,616,111 B1 | | 9/2003 | White |
| D633,504 S | | 3/2011 | Alexander, Jr. |
| 7,921,525 B1 | * | 4/2011 | Lucas ..................... A47G 1/17 24/564 |
| D642,579 S | | 8/2011 | Deutsch et al. |
| D643,433 S | | 8/2011 | Hsieh et al. |
| D676,851 S | | 2/2013 | Finnegan et al. |
| 8,374,657 B2 | | 2/2013 | Interdonato |
| 8,385,974 B1 | | 2/2013 | Bishop |
| 8,480,144 B2 | | 7/2013 | Potter et al. |

(Continued)

FOREIGN PATENT DOCUMENTS

| CN | 101751082 | 6/2010 |
| CN | 20281714 | 3/2013 |
| JP | 2002199070 | 7/2002 |

OTHER PUBLICATIONS

Website screenshot of iPad Accessory—Silicone Hand Grip; YUYUANSZ.com; captured Feb. 4, 2014.

(Continued)

*Primary Examiner* — Paul T Chin
(74) *Attorney, Agent, or Firm* — Andrew C. Landsman; Godfrey & Kahn, S.C.

(57) ABSTRACT

An ergonomic tablet computer holder is removably attached to only one side of a tablet computer. The ergonomic tablet holder has a contoured profile to allow a user to comfortably hold the tablet computer with one hand. The ergonomic tablet holder has a base and a clip and is removably attached to the tablet computer by friction.

2 Claims, 10 Drawing Sheets

(56) References Cited

U.S. PATENT DOCUMENTS

| | | |
|---|---|---|
| D690,704 S | 10/2013 | Padilla et al. |
| D691,146 S | 10/2013 | Perez |
| 8,567,832 B2 | 10/2013 | Kannaka |
| 8,576,563 B2 | 11/2013 | Yang et al. |
| 8,638,557 B2* | 1/2014 | Tsai .................... F16M 11/041 361/679.56 |
| 8,885,338 B1* | 11/2014 | Simpson .................. A45F 5/10 224/929 |
| 2006/0163894 A1* | 7/2006 | Mishek ................ A45F 5/1046 294/171 |
| 2006/0274493 A1* | 12/2006 | Richardson .......... G06F 1/1626 361/679.4 |
| 2008/0259551 A1* | 10/2008 | Gavenda .................. G06F 1/16 361/679.31 |
| 2011/0266316 A1 | 11/2011 | Ghalib et al. |
| 2012/0031937 A1 | 2/2012 | Baker |
| 2012/0037771 A1* | 2/2012 | Kitchen ................ G06F 1/1632 248/223.41 |
| 2012/0145863 A1 | 6/2012 | Lin |
| 2012/0224318 A1 | 9/2012 | Carleton |
| 2012/0246879 A1 | 10/2012 | Pestal et al. |
| 2012/0270599 A1 | 10/2012 | Mori et al. |
| 2012/0307439 A1* | 12/2012 | Weng .................. G06F 1/1632 361/679.4 |
| 2012/0326003 A1* | 12/2012 | Solow ................ F16M 11/041 248/688 |
| 2012/0327593 A1* | 12/2012 | Finnegan ................ A45F 5/00 361/679.56 |
| 2013/0005401 A1 | 1/2013 | Rosenhan et al. |
| 2013/0037682 A1* | 2/2013 | Wang .................. F16M 11/041 248/371 |
| 2013/0082471 A1 | 4/2013 | Castorano |
| 2013/0146625 A1 | 6/2013 | Karle et al. |
| 2013/0165190 A1* | 6/2013 | Ko .......................... H05K 5/03 455/575.8 |
| 2013/0219584 A1 | 8/2013 | Atwood et al. |
| 2013/0295549 A1 | 11/2013 | Hills |
| 2014/0077056 A1* | 3/2014 | Ghosh .................. F16M 11/041 248/690 |
| 2014/0166832 A1* | 6/2014 | Briant .................. F16M 11/041 248/205.1 |
| 2014/0252786 A1* | 9/2014 | Singhal ................ G06F 1/1656 294/137 |
| 2014/0285968 A1* | 9/2014 | Budge .................... F16M 13/04 361/679.56 |
| 2015/0001265 A1* | 1/2015 | Hart ........................ A45F 5/021 294/165 |
| 2015/0009672 A1* | 1/2015 | Girault .................. G06F 1/1632 294/137 |
| 2016/0015168 A1* | 1/2016 | Sun ........................ F16M 13/00 248/447.1 |

OTHER PUBLICATIONS

Internet article from The iPad News; "Grip Sense, Innovative Case for iPad"; Jul. 27, 2012.

Internet article from Computer Shopper; "11 Top Cases & Covers for the Google Nexus 7 Tablet"; Aug. 14, 2012.

Website screenshot from theaccessoryking.com for the product—Arkon MyHandstand iPad Tablet Hand Holder w/Elastic Hand Strap & TPU Skin Arkon MHIP100; captured Feb. 4, 2012.

Website screenshot from Samsung for the product Smart PC Pro Hand Strap Case; captured Feb. 4, 2014.

Website screenshot from Kickstarter for the prouduct the Tablet Claw; captured Feb. 4, 2014.

Internet article from Trendhunter Magazine; "Grip-Enhancing Tablet Wraps"; Nov. 25, 2013.

International Search Report for PCT/US15/27350; mailed Jul. 28, 2015.

* cited by examiner

ERGONOMIC TABLET COMPUTER HOLDER

CROSS-REFERENCE TO RELATED APPLICATION

This application is based on and claims priority to U.S. Provisional Patent Application No. 61/983,316 filed on Apr. 23, 2014, which is incorporated herein by reference in its entirety for all purposes.

FIELD OF THE INVENTION

The present invention relates generally to the field of holders for tablet computers. More particularly, the present invention relates to an ergonomic tablet computer holder that attaches to a tablet computer on one side of the tablet.

BACKGROUND

In recent years, the popularity of the tablet computer has grown substantially. In particular, the Apple iPad is the industry leader with sales of over 225 million units since its introduction in 2010. Tablet computers come in varying sizes but all share common features in that they all have a thin profile, a light weight design compared to laptop computers, a touchscreen, and a substantially rectangular shape. The combination of certain of these properties, although beneficial for the user, can cause the user discomfort during prolonged usage. FIGS. 1 and 2 show an example of a typical tablet computer 10, which includes a body 100 that includes all of the necessary components and batteries and a touchscreen 102 that encloses the components and batteries. The touchscreen 102 is surrounded by a bezel 104 that provides a surface that a user can use to hold the tablet computer 10 without inadvertently contacting the touchscreen.

As shown in FIG. 1, a person using tablet computer 10 generally holds the tablet computer at its edges so as not to unintentionally interact with the touchscreen 102. The person often holds the tablet computer 10 with one hand, again at the edge, so has to have the other hand free to operate or interact with the touchscreen of the tablet computer 10. The thin profile of the tablet computer 10 can make holding it uncomfortable over a long period of time, as the slim profile, and still-large size compared to the user's hand, does not conform to the shape of the user's hand. Further, even though typical tablet computers are much lighter in weight than conventional laptop computers, they are still very dense, that is, heavy for their size when held for an extended period of time, and thus cause fatigue.

A device is needed which can be removably attached to a tablet computer to allow the user to easily and comfortably hold the tablet computer. Such a device will preferably cover a wide range of hand and tablet sizes, and be usable when the tablet is used when oriented in both a portrait and landscape orientation. Some such devices in general do exist, but each has its disadvantages. For instance, U.S. Patent Publication No. 2012/0327593 shows a tablet computer holding device with a bridge connecting two grip portions on opposite sides of the tablet. As shown in FIGS. 1 and 2, tablets are often held with one hand, and so the second grip portion, and the bridge connecting the two, add unnecessary expense, weight, and difficulty applying the device to a tablet, without any real advantage. As such, there is a need for a device that can be removably attached to only one side of a tablet computer to allow a user to easily and comfortably hold the tablet computer.

SUMMARY

The present invention relates to an ergonomic holder for a tablet computer. The tablet computer has a thickness and includes a front surface that includes a touchscreen and a bezel, and a base that includes a rear surface. The ergonomic tablet holder has a base that includes a handle portion and a base body portion extending from the handle portion. The base also includes a channel integrally formed into the handle portion. A resilient clip is attached to the base and has a bezel bearing surface and a clip body portion. In some embodiments, the handle portion may have a plurality of protrusions and/or depressions to provide a comfortable grip. The handle portion may also be at least partially made of a material that is soft to the touch such as silicone. In one embodiment the channel is generally C-shaped and corresponds to a generally C-shaped portion of the clip. When the C-shaped portion of the clip is inserted into the C-shaped channel of the base, the clip engages the channel and is retained therein by friction. The clip may also include a base retention portion that engages a clip retention channel in the base.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

DETAILED DESCRIPTION

Figure 1:
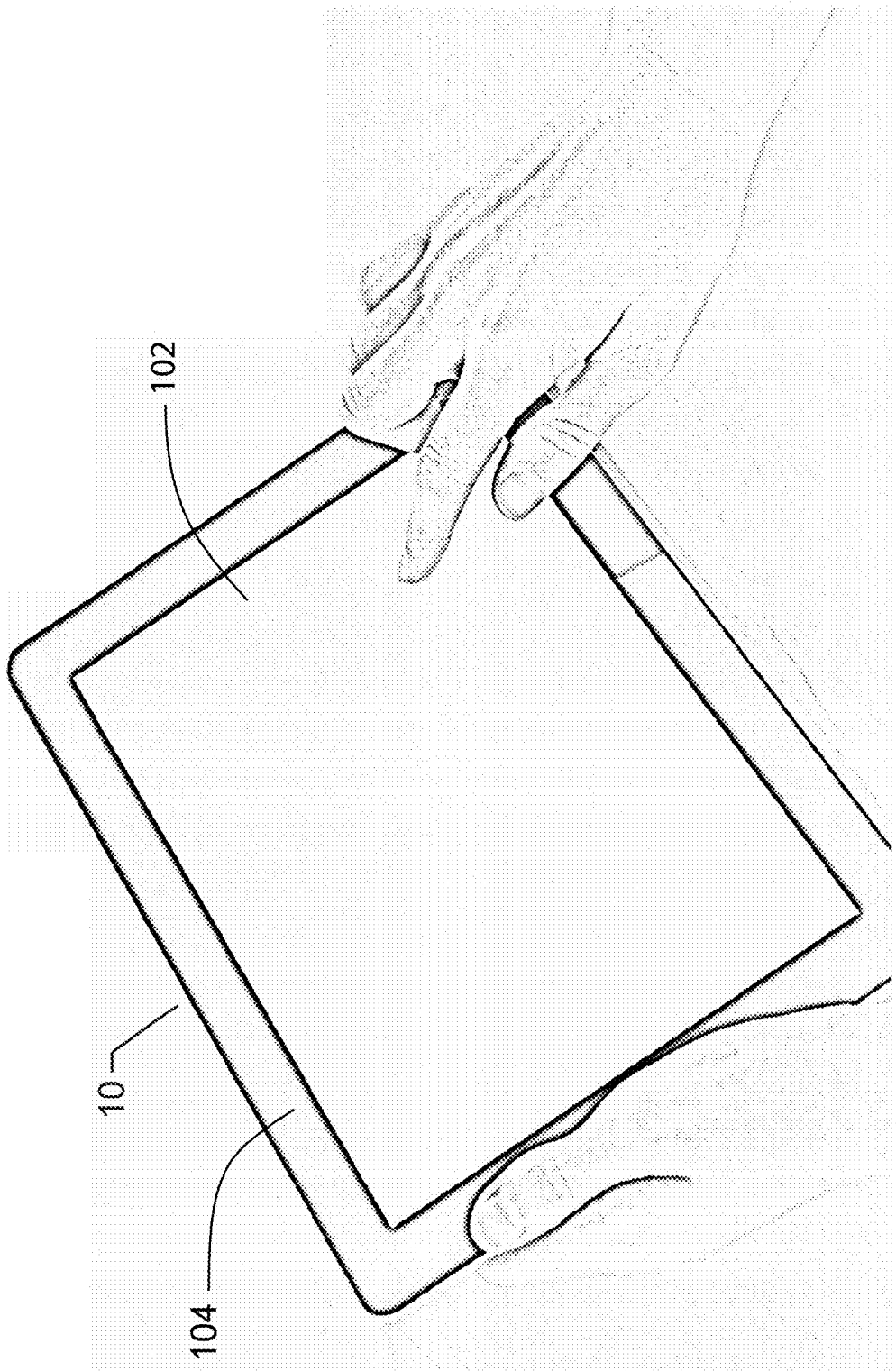
FIG. 1 is a perspective view of a typical tablet computer showing how a user holds the tablet computer with one hand.
Figure 2:
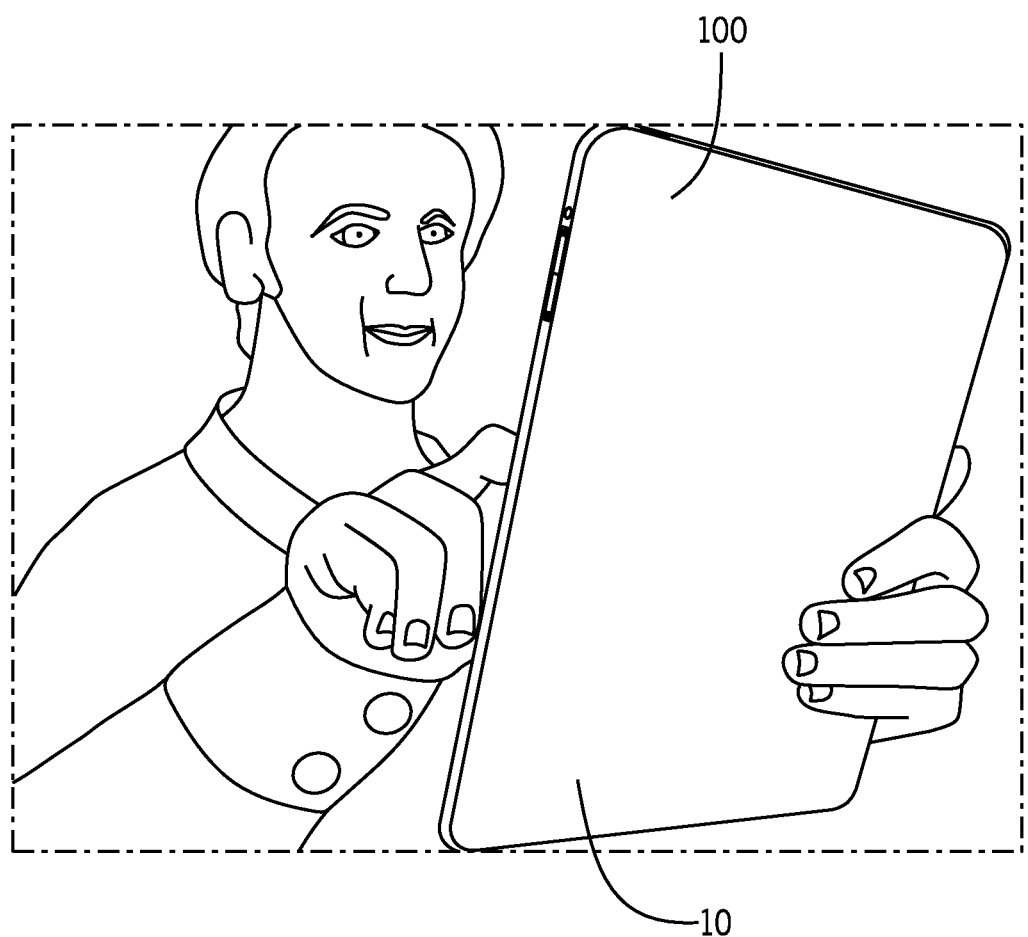
FIG. 2 is another perspective view of the typical tablet computer of FIG. 1 showing the back of the tablet computer as it is held by a user.
Figure 3:
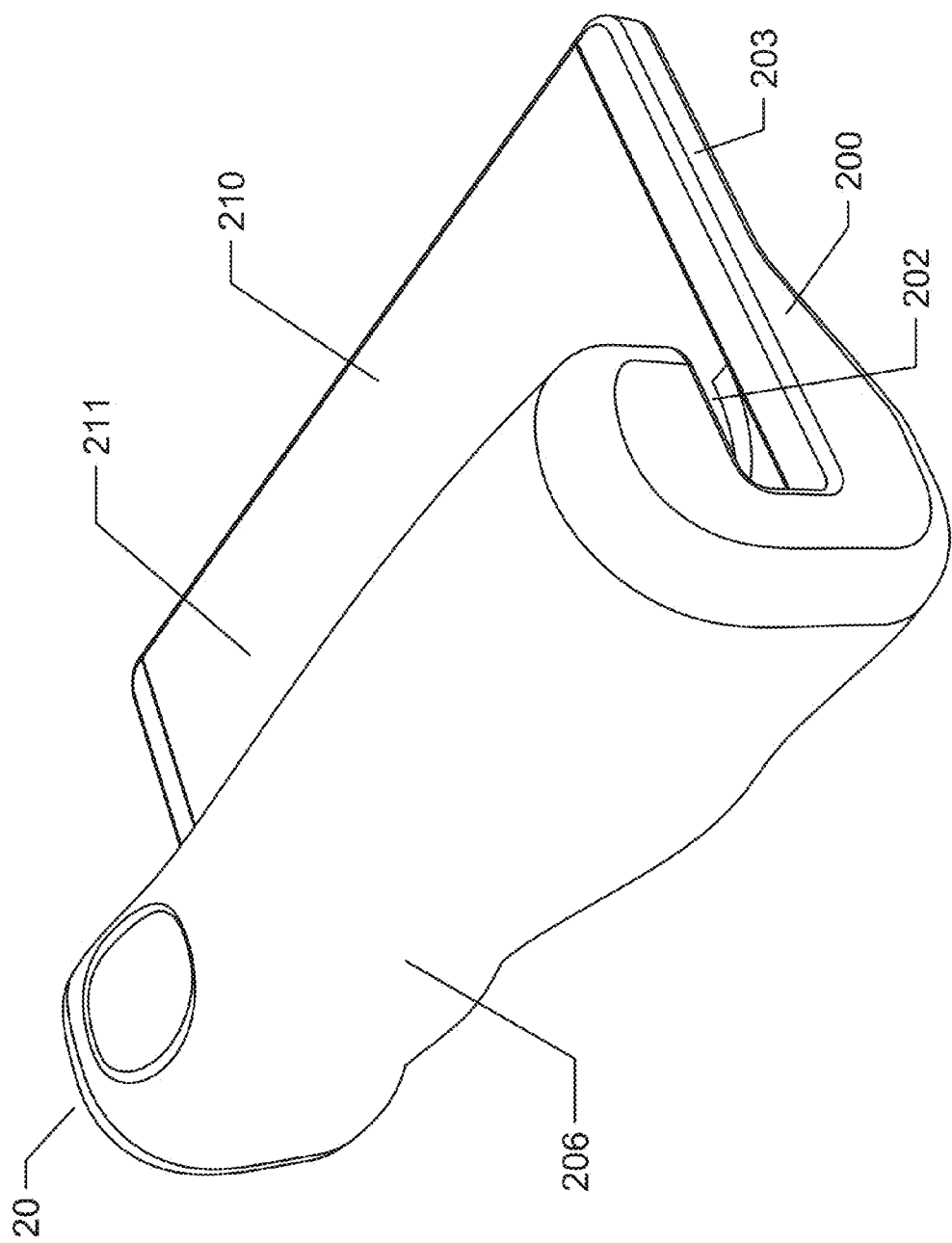
FIG. 3 is a perspective view of an ergonomic tablet holder in accordance with the invention showing the outside of the tablet holder.
Figure 4:
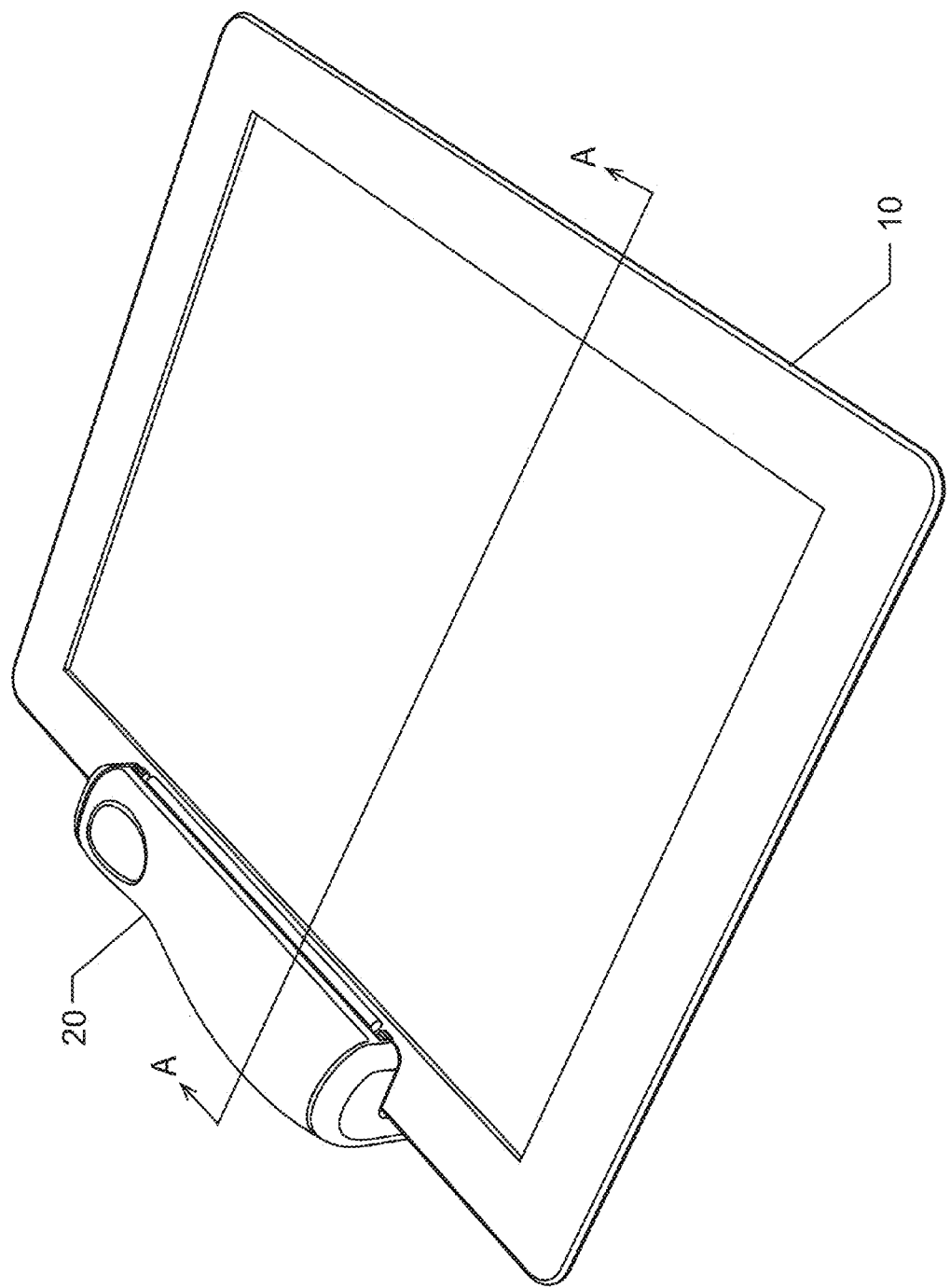
FIG. 4 is a perspective view of the ergonomic tablet holder of FIG. 3 showing how the tablet holder is attached to a tablet computer.
Figure 4A:
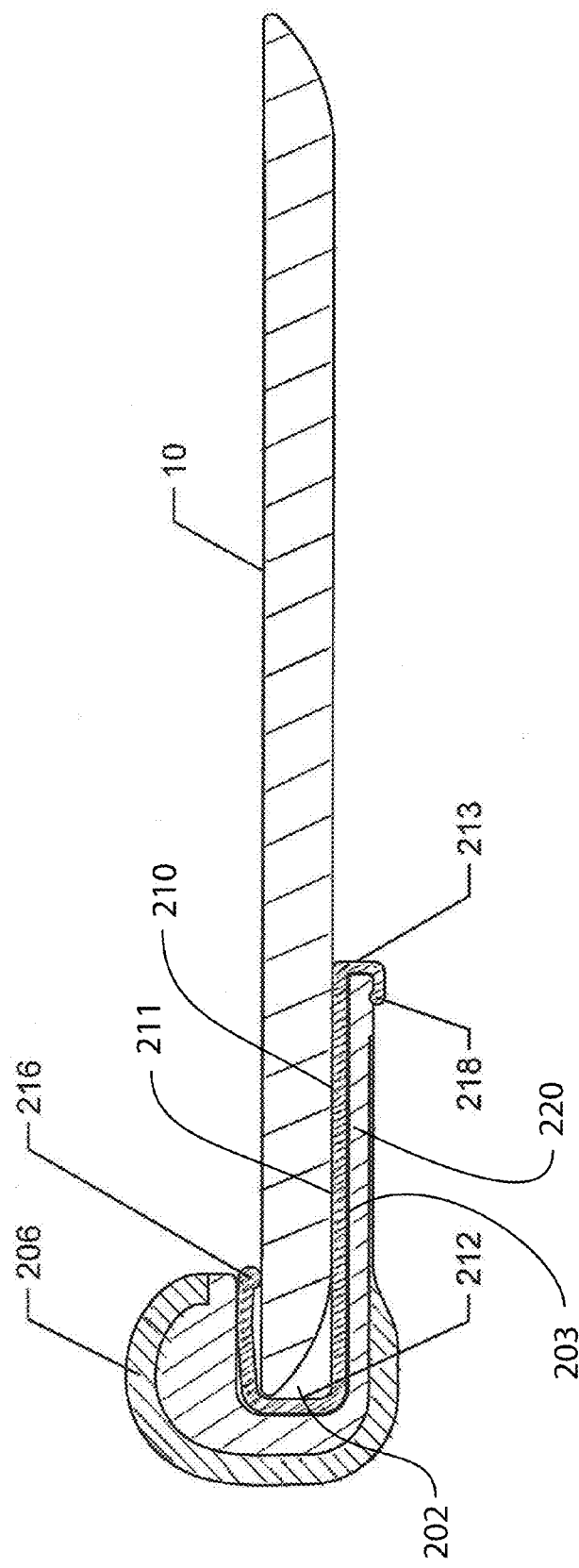
FIG. 4A is a section view of the ergonomic tablet holder of FIG. 4 taken generally along the line A-A in FIG. 4.
Figure 5:
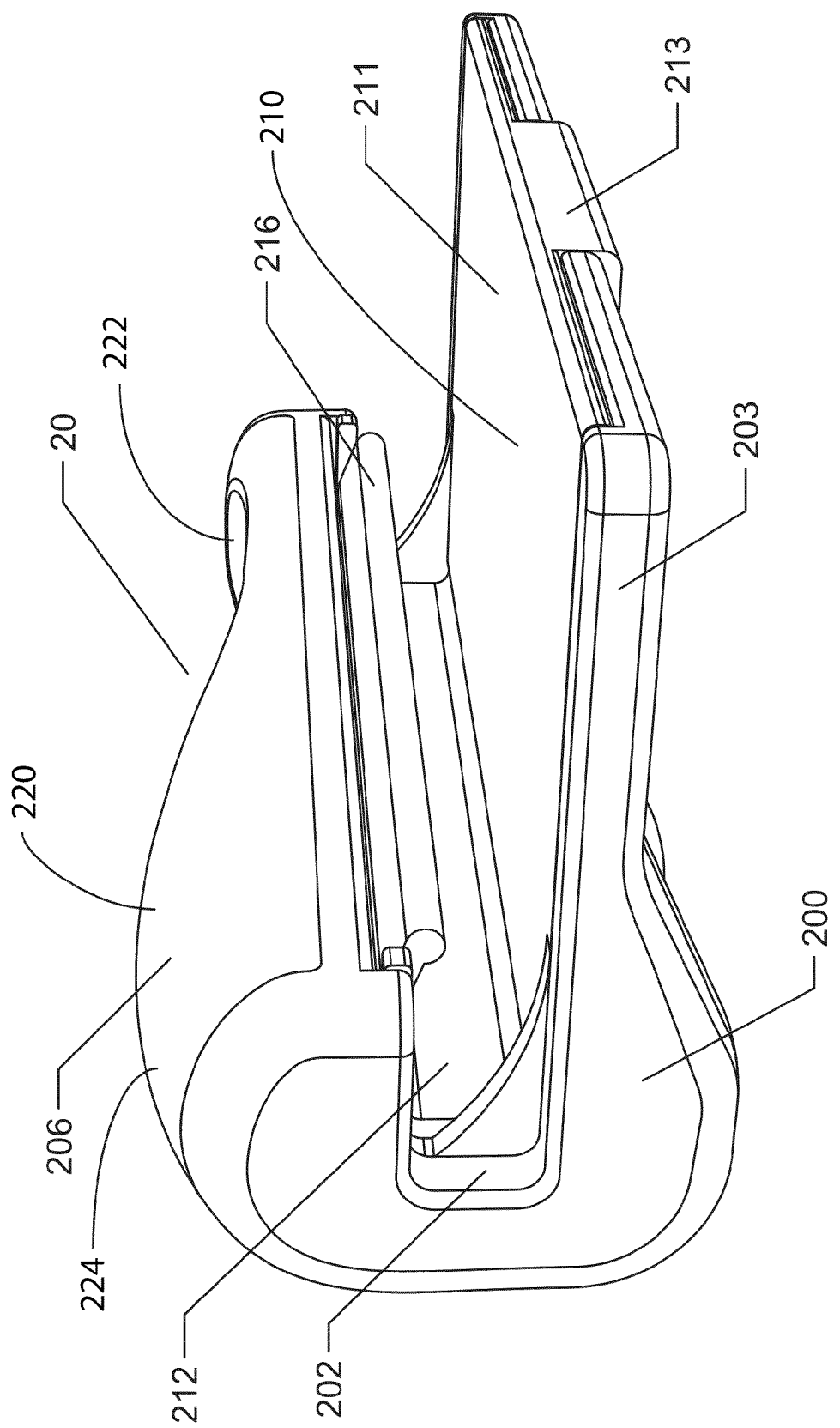
FIG. 5 is another perspective view of the ergonomic tablet holder of FIG. 3 showing the inside of the tablet holder.
Figure 6:
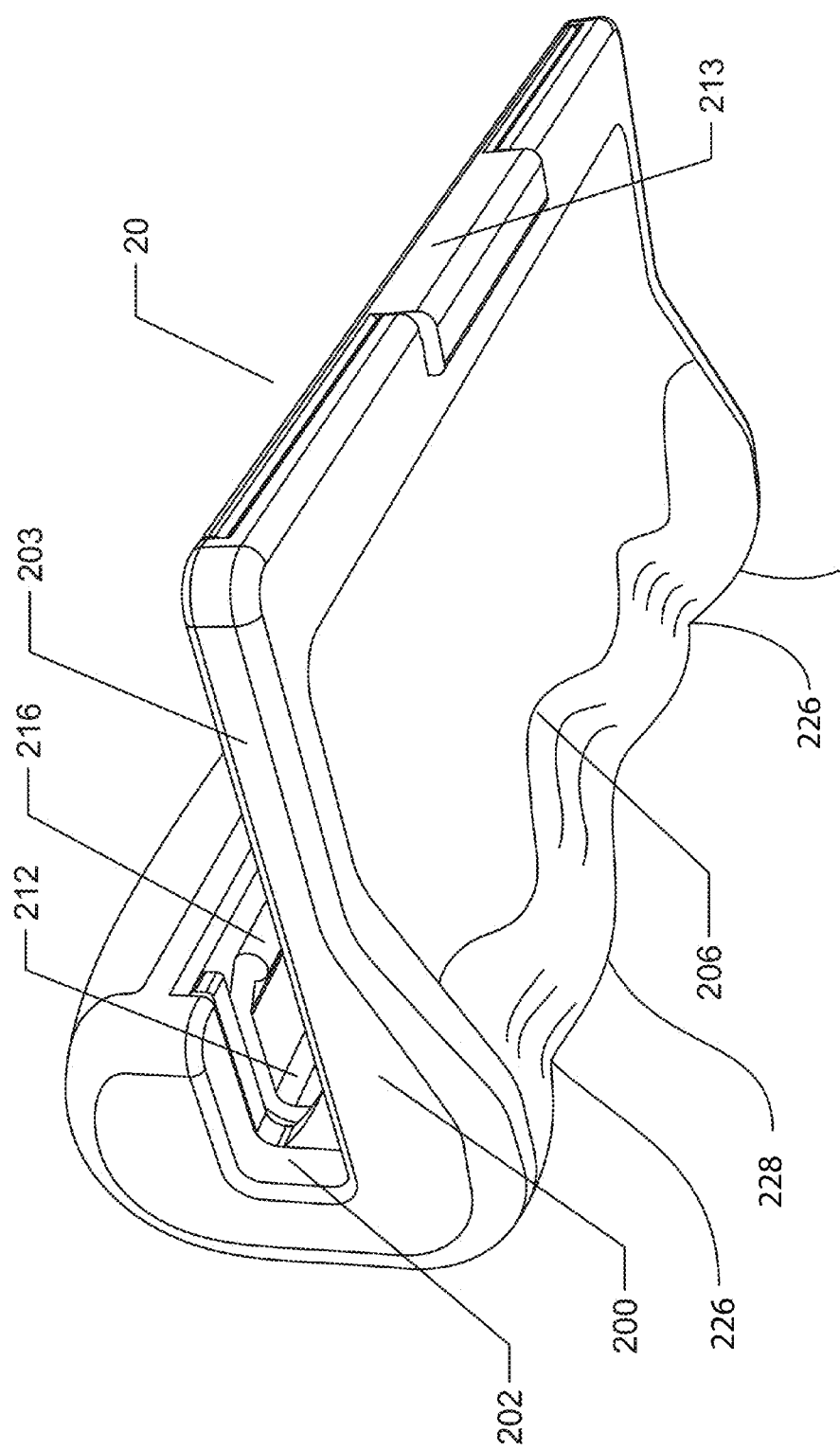
FIG. 6 is another perspective view of the ergonomic tablet holder of FIG. 3 showing the underside of the tablet holder.
Figure 7:
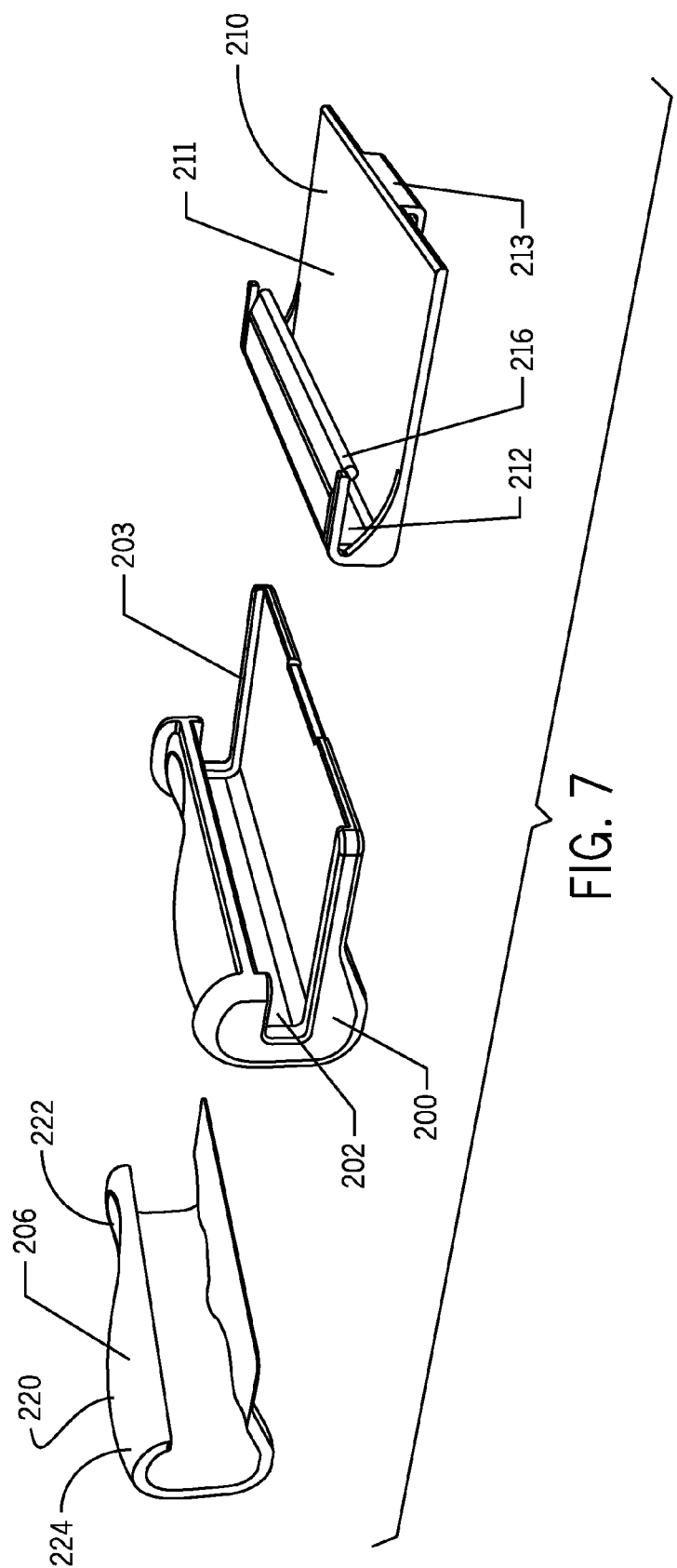
FIG. 7 is an exploded perspective view of the ergonomic tablet holder of FIG. 3.
Figure 8:
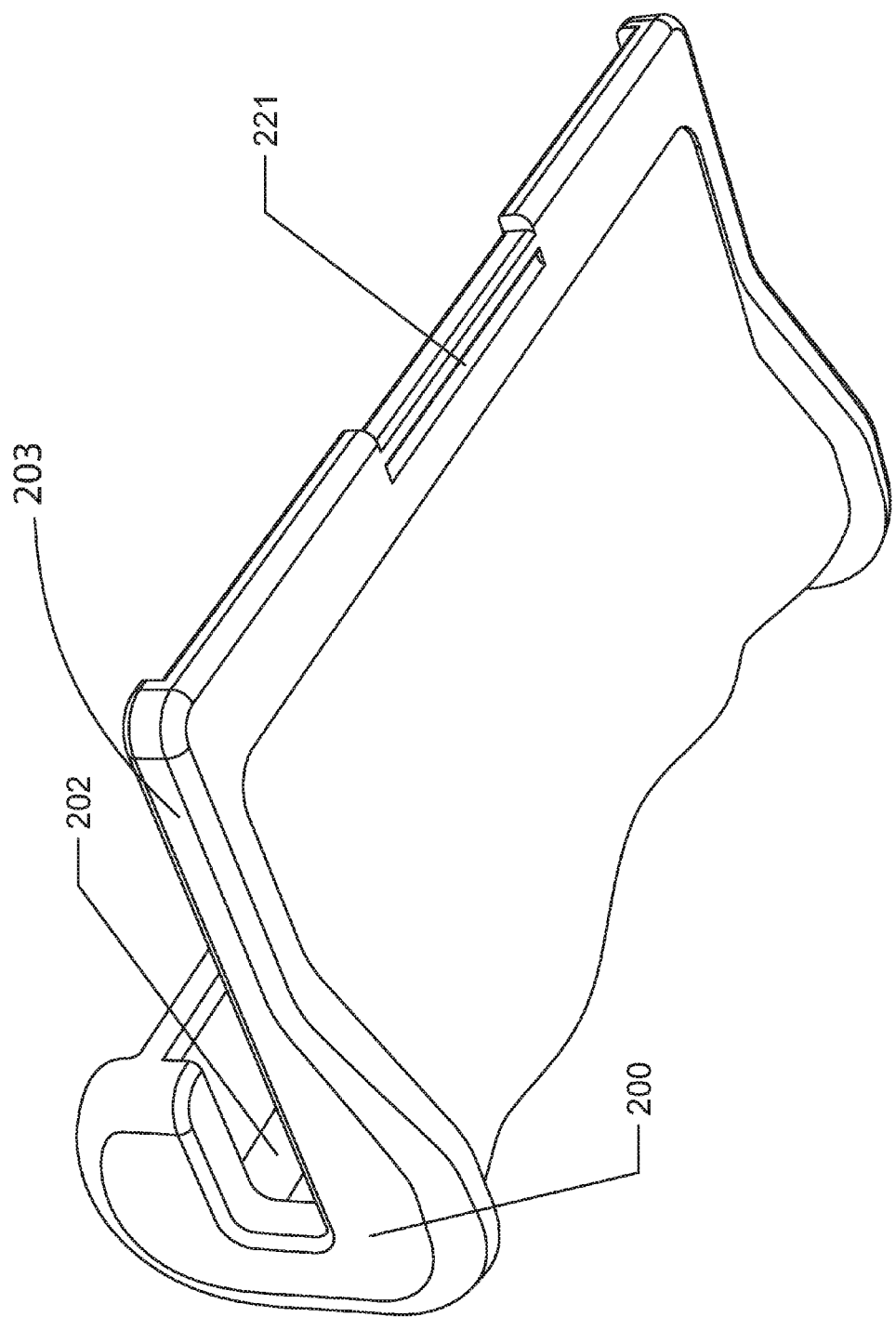
FIG. 8 is a perspective view of a base for the ergonomic tablet holder of FIG. 3 showing the underside of the base.
Figure 11:
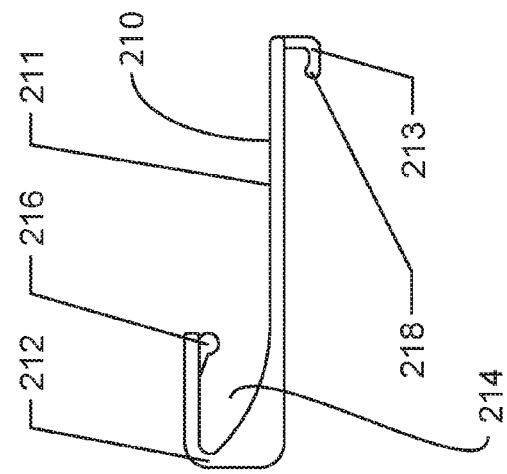
FIG. 11 is a side view of a clip for the ergonomic tablet holder of FIG. 3.
Figure 10:
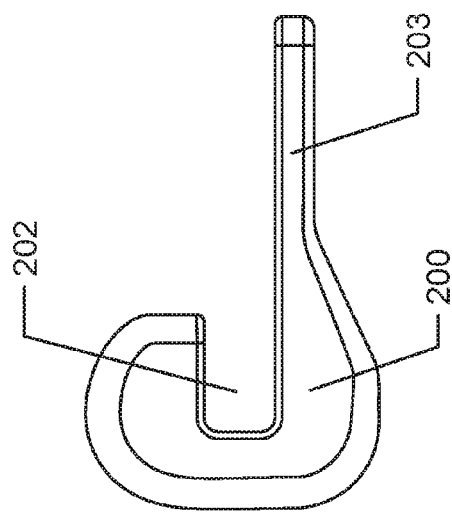
FIG. 10 is a side view of the base of FIG. 8.
Figure 9:
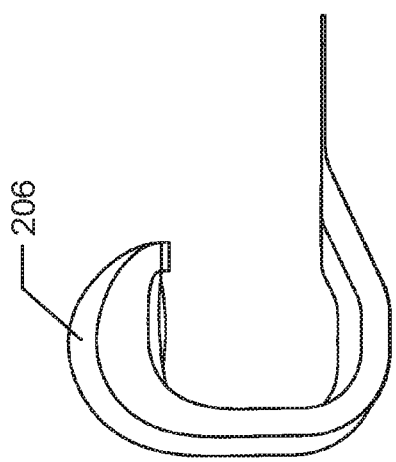
FIG. 9 is side view of a handle for the ergonomic tablet holder of FIG. 3.

Referring to FIG. 3, one embodiment of an ergonomic tablet holder 20 in accordance with the invention is shown.

The tablet holder 20 includes a base 200 that provides the base structure of the tablet holder. Base 200 includes a generally C-shaped channel 202 that provides a space into which a retaining clip 210 may be inserted. Although C-shaped channel 202 has a generally C-shape, other suitable shapes may be used without departing from the invention. Extending from the bottom of C-shaped channel 202 is a base 203 that extends along the back of tablet computer 10 when tablet holder 20 is removably attached to the tablet computer. Base 203 has a sufficient length to provide a surface for a user's fingers to grip, and is also long enough to distribute the force generated when a user holds tablet computer 10 by ergonomic tablet holder 20. As shown, tablet holder 20 is made to be used one-handed, with a user holding the tablet holder with his/her left hand. Furthermore, although the embodiment shown is for a left hand grip, a right hand grip may be used without departing from the invention. As a user grips ergonomic tablet holder 20, the natural one-handed gripping position tends to twist the tablet holder counter-clockwise and off of the tablet computer 10. The length of base 203 counteracts the twisting force described above and exerts frictional force to the back of tablet computer 10, which further secures ergonomic tablet holder 20 to the tablet computer. In the embodiment shown, base 200 is made of injection molded plastic, but any suitable material may be used without departing from the invention.

In the embodiment shown, a handle 206 is attached to and substantially covers the outside of base 200 and provides a soft contoured surface that a user grips when using the tablet holder 20. Handle 206 may be contoured and/or made of any suitable material to provide desired ergonomic performance. As shown, handle 206 has a relatively higher profile section 220 in the center of the length, and relatively low profiles at each side of the higher profile, so that the center high profile section fits into the area of the hand nearest the metacarpophalangeal joint of the user's thumb. On one side of the higher profile section 220 is a thumb depression 222 to fit the user's thumb. At the other end of the high profile section is a low profile section 224 to fit with the user's thenar eminence. In the embodiment shown in FIGS. 3, 5, 6, and 8, handle 206 is made of silicone and is overmolded onto the base 200, which produces an essentially unitary handle base 208. Additionally handle 206 has a plurality of depressions 226 and protrusions 228 to allow a user to more comfortably hold the tablet holder 20. The depressions 226 and protrusions 228 correspond to the space between the user's fingers and the user's fingers themselves, respectively, which provides enhanced contact and between the tablet holder 20 and the user and increases grip comfort. Of course, handle 206 may also be removably attached to base 200 without departing from the invention. Furthermore, handle 206 may be omitted altogether by producing base 200 including the contours normally provided by the handle. Such an embodiment may not benefit from the soft feel of silicone or similar materials as described above, but could be a lower cost or more durable alternative construction.

As shown in FIGS. 4-10, ergonomic tablet holder 20 includes a retaining clip 210 that is removably attached to base 200. As shown, retaining clip 210 is made of a light weight, flexible, somewhat resilient material that will not scratch or mar tablet computer 10 and has a main body 211, a generally C-shaped section 212 at a first end that corresponds to the C-shaped channel 202, and a base retention portion 213 at a second end. Although C-shaped section 212 has a generally C-shape, other suitable shapes may also be used without departing from the invention. C-shaped section 212 forms a recess 214 into which tablet computer 10 may be inserted. In the embodiment shown, C-shaped section 212 has a height that is slightly less than the thickness of tablet computer 10. Retaining clip 210 further includes a bearing surface 216 that contacts the bezel 104. As tablet computer 10 is inserted into recess 214, the C-shaped section 212 is flexible enough to expand slightly, causing the tablet computer to be captured between main body 211 and bearing surface 216. The ergonomic tablet holder 20 is held to the tablet computer 10 substantially by friction. In the embodiment shown, C-shaped channel 202 has a height that is slightly smaller than the height of C-shaped section 212, which aids in retaining retaining clip 210 as it is inserted into C-shaped channel 202, and also causes the clip to exert additional clamping force onto tablet computer 10. Optional base retention portion 213 includes a retention boss 218 that engages clip retention channel 221 on base 200 when retaining clip 210 is inserted into the base to more securely attach the clip to the base. In the embodiment shown, retaining clip 210 may be made of any suitable resilient material including but not limited to spring steel or plastic. Additionally, retaining clip 210 may be coated with anti-slip material, or additives may be included in the material itself, to improve the friction performance of the clip against the metal, plastic, or glass surfaces of tablet computer 10.

As indicated above, the ergonomic tablet holder 20 may be applied to the tablet computer 10 solely by means of friction. Alternatively, the ergonomic tablet holder 20 could be applied to the tablet computer 10 by adhesive means, most preferably a material variously known as "suction cup tape" or "micro suction tape," as such tape is easily removable and easily reapplied, without losing adhesion, or at least the adhesion of which can be readily restored.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. An ergonomic holder for holding one side of a tablet computer having a thickness, a front surface including a touchscreen and a bezel, and a rear surface, the holder comprising:
   a base having a handle portion and a base body portion extending from the handle portion;
   a channel integrally formed into the handle portion;
   a retaining clip removably attached to the base, the retaining clip having a bezel bearing surface and a clip body portion;
   the retaining clip further including a base retention portion;
   the base further including a retaining clip retention channel; and
   wherein the base retention portion engages the retaining clip retention channel when the retaining clip is attached to the base.

2. An ergonomic holder for holding one side of a tablet computer having a thickness, a front surface including a touchscreen and a bezel, and a rear surface, the holder comprising:
   a base having a handle portion and a base body portion extending from the handle portion;

the base body portion including a retaining clip retention channel;

the handle portion including a plurality of depressions and protrusions to provide a comfortable grip;

a generally C-shaped channel integrally formed into the handle portion;

a retaining clip including a generally C-shaped portion having a height slightly less than the thickness of the tablet computer;

the retaining clip removably attached to the base, with the generally C-shaped portion engaging the generally C-shaped channel, the retaining clip having a bezel bearing surface and a clip body portion; and the retaining clip further including a base retention portion that engages the retaining clip retention channel when the retaining clip is attached to the base.

* * * * *